March 24, 1970     T. P. AGLIATA ET AL     3,501,838
PANTOGRAPHIC IMPLEMENTED OVERHEAD PROJECTOR
Filed March 20, 1968     3 Sheets-Sheet 1

INVENTORS
THOMAS P. AGLIATA
HAROLD E. CLARK
ATTORNEYS

March 24, 1970   T. P. AGLIATA ET AL   3,501,838
PANTOGRAPHIC IMPLEMENTED OVERHEAD PROJECTOR
Filed March 20, 1968   3 Sheets-Sheet 3

INVENTORS
THOMAS P. AGLIATA
HAROLD E. CLARK
BY
ATTORNEYS

United States Patent Office 3,501,838
Patented Mar. 24, 1970

3,501,838
PANTOGRAPHIC IMPLEMENTED OVERHEAD PROJECTOR
Thomas P. Agliata, Rochester, and Harold E. Clark, Penfield, N.Y., assignors to Xerox Corporation, Rochester, N.Y., a corporation of New York
Filed Mar. 20, 1968, Ser. No. 714,700
Int. Cl. B431 13/10
U.S. Cl. 33—25                                 9 Claims

ABSTRACT OF THE DISCLOSURE

Apparatus for adding information while projecting an object onto a viewing screen and an auxiliary screen. The apparatus includes an overhead projector and a pantographic device connecting an auxiliary screen with a marking stylus at the object on the platen of the projector so that additional information can be marked on the object while it is being projected to both screens without substantially interfering with the projected image.

This invention relates to overhead projectors and more particularly to apparatus for adding information to a viewing station without substantially interfering with the projected image.

Since the disclosure of the overhead projector many of its uses have been instructional in nature and geared toward the classroom, lecture hall, seminar or business conference. Many times the projected image for instructional uses must be supplemented by additional information. This is usually done by marking the transparency or opaque object that is projected with a pencil or crayon, the marking then being projected along with the other data on the transparency through the overhead projector to a screen for viewing by students or those gothered at the conference, seminar or lecture.

One problem with having the overhead projector project information that is modified is that the additions by crayon or other marking material must be made by the human hand. The human hand is a physical obstacle which results in a significant disruption to the effectiveness of an overhead projector as compared with the use of a hand with a blackboard, for example. On a blackboard, the human hand is a small fraction of the total area and does not interfere with a large fraction of the picture. However, when information is added to a small transparency or opaque object projected through the overhead projector and the addition is made by hand, the hand obstructs a very large proportion of the total area and is a distinct distraction making it impossible to take rapid notes or fully concentrate on the data presented. If the object being projected is of a small size as easily can be done with magnification capabilities of overhead projectors, it becomes very difficult to write on the object directly because of the area obscured by the hand.

Contemporary overhead projectors do not allow the lecturer to view the image without turning from the projector nor do they allow the lecturer to write or draw on the object without blotting out a large portion of the image rays due to the location of the arm or hand of the lecturer in the optical path of the projection system.

The apparatus described herein eliminates these difficulties by removing the hand from the projection area and yet providing the capability of making additions to the transparency or opaque object at the platen of the overhead projector for projection onto the viewing screen.

It is an object of this invention to provide a projection system with the ability to add information projected without substantially interfering with the projected image.

Another object of this invention is to provide an auxiliary viewing station to the main projection system for easy viewing of images by lecturer and ease in making additions to images.

Yet another object of this invention is to improve means for projecting objects for viewing and changing the objects while they are being viewed.

Still another object is to provide apparatus for updating, adding to or altering a certain portion of the object while the object is being viewed by the operator and an audience.

These and other objects are accomplished by means of the combination of an overhead projector with a platen for a transparency and/or opaque object and a viewing station for the audience with a second or auxiliary viewing station for the instructor or lecturer and a pantograph device connecting a stylus from the auxiliary viewing station to the platen of the overhead projector. When the instructor copies information on his auxiliary viewing station the information is physically placed at the object on the platen of the ovehead projector via the pantograph device and is simultaneously projected to the audience viewing station and the auxiliary station used by the instructor.

For a better understanding of the invention as well as other objects and further features thereof, reference is had to the following detailed description of the invention to be read in conjunction with the accompanying drawings wherein.

Figure 1:
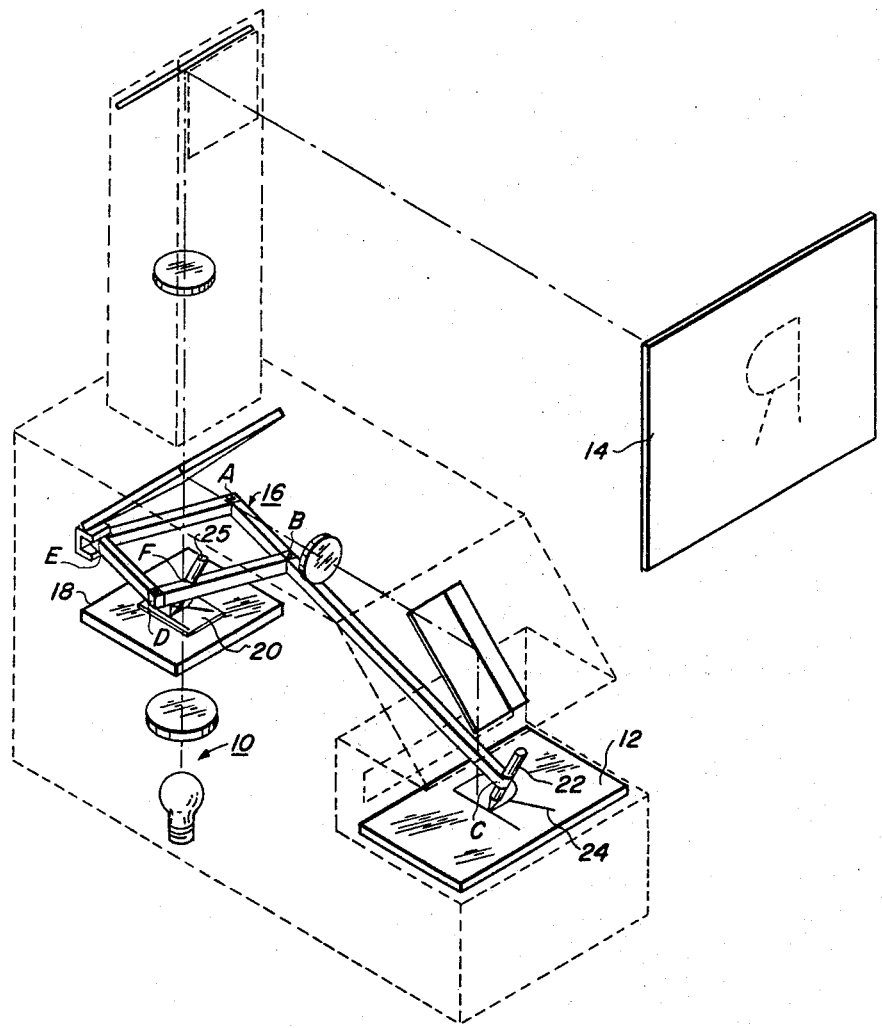
FIGS. 1 and 2 are schematic isometric representations of overhead projectors incorporating this invention.

A concept of an embodiment of this invention is depicted in FIG. 1 as an overhead projector featuring an auxiliary viewing station and pantograph implemented marking device. The projector generally referred to as 10 shown herein has an auxiliary viewing screen 12 on which the lecturer views the same image that is presented on the large viewing screen 14. With slight changes in the optical system, either or both screens can be rear illuminated. A pantograph mechanism generally designated as 16 made up of thin metal or plastic members is located between the auxiliary screen 12 and the platen 18 on which a small transparency 20 is located for projection. If the lecturer desires to write or draw on the transparency he makes the motion of doing so over the image on the auxiliary screen by moving the pointless stylus 22 over the image 24 visible to him on the auxiliary screen 12. The movement is in the configuration of the data that he wishes to add to the image he sees on the screen.

Through the pantograph 16 connecting the stylus 22 used by the lecturer with a marking stylus 25 at the platen 18 of the projection system, the lecturer uses the marking point of the stylus 25 to write on the transparency object 20 on the platen 18. As the object is marked, the marking on the object as well as the entire object is projected both to the auxiliary screen 12 and main viewing screen 14. This operation occurs simultaneously with the mark appearing on the transparency.

Figure 2:
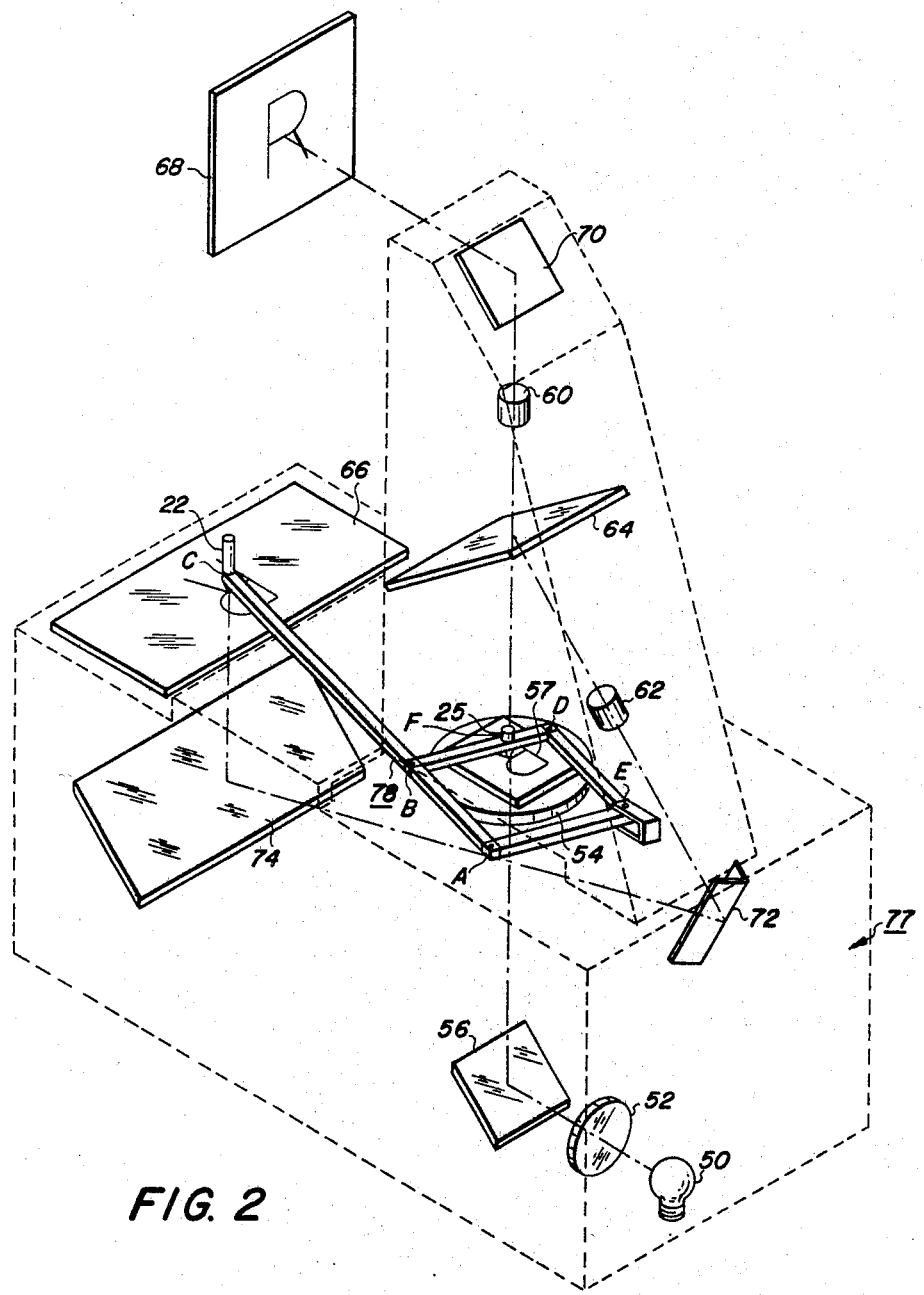
Figure 3:
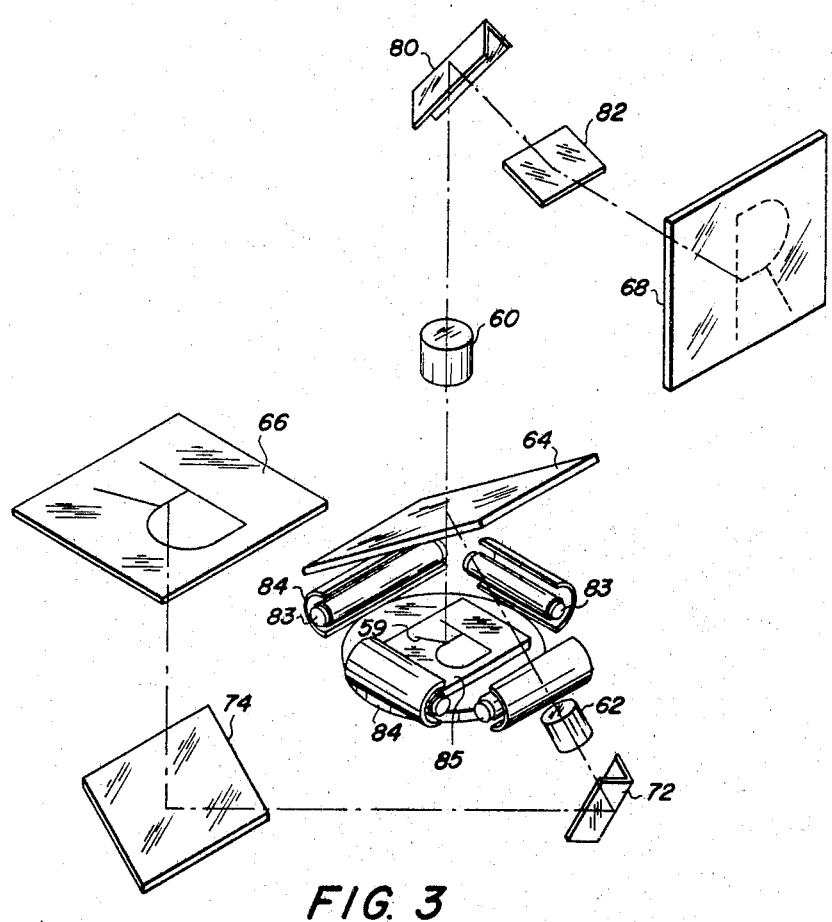
FIG. 3 is a schematic representation of an alternative optical system for this invention.

Arrangements of the optics for the two screen system are shown in FIGS. 2 and 3. The layout features a minimum of mirrors as well as practical locations of one screen in relation to the other and both in relation to the platen of the overhead projector so that the marking by the lecturer with the stylus 22 can be translated directly to marking stylus 25 at the image 20 of the platen 18 on the projector. For the optical system of the projector shown in FIG. 2, there is a light source 50 which together with lenses 52 and 54 and with mirror 56 comprise the light condenser. The light source 50 is located inside the focal plane of the lens 52 so that the beam of light leaving the lens 52 is slightly diverging. The lens 54 is a fresnel lens or a plano-convex lens with the plano surface close to the plane of the object 57 to be projected. The light beam is brought to focus by lens 54 in the planes of lenses 60 and 62.

Along the optical path between lens 54 and the lenses 60 and 62 is a partially silvered mirror 64 which acts as a beam splitter and transmits approximately 80–95% of the beam of light that will focus in the plane of the lens 60 while reflecting about 5% of the beam to be focused in the plane of lens 62. The beam splitter 64 is a thin window glass perhaps on the order of thickness of 1/16 of an inch with the side nearest lens 60 optically coated with an anti-reflecting film. The purpose of the coating is to eliminate a double image on the second viewing station screen 66. The transparency 57 which is the object to be viewed on the screens is imaged onto the main viewing station 68 by lens 60. Mirror 70 serves to direct the beam from lens 60 in a more or less horizontal direction toward the viewing screen 68. The lens 62 images the object 57 onto the screen 66 by way of reflections off the roof mirror 72 and a plane mirror 74. The roof mirror is required for proper image orientation on the screen 66.

The pantograph shown operates in a horizontal plane containing both the object 57 and the auxiliary viewing screen 66. If the room location of the projected image is to be changed, the lecturer can do so by rotating mirror 70 90° and rotating the object 90° in the same direction. The lecturer can then project 90° to the original direction. The optical system is shown embodied in a light tight housing 77 with internal supports present to maintain the optical elements in proper orientation. The pantographic device 78 is positioned within the housing and extends from the pointless stylus 22 to the marking stylus 25.

FIG. 3 shows another mirror combination to present the image on the viewing screen 68 directly in front of the screen 66 so that the lecturer viewing the screen 66 need look only directly in front of him to see the viewing screen 68. The difference in this figure from that of FIG. 2 is the removal of mirror 70 and the substitution therefor of roof mirror 80 and the plane mirror 82. This arrangement permits the instructor to maintain the screen 66 in front of him with an image orientation readable to him. Further, the viewing screen 68 in the vertical plane is in front of him with the same image orientation thereon. Now the instructor may make his marks or changes on the object 59 by operating the pantograph connecting the object with the screen 66 and have those changes projected to the screen 66 and viewing screen 68 directly in front of him. Hence, he need not turn around to see the viewing screen 68 as seen by the students or attendants at the lecture or conference. This projection system represents use of the invention with an opaque overhead projector. The image is formed in lenses 60 and 62 by their projection of reflected light rays from the object 59 from lamp sources 83. The lamps are provided with shield reflectors 84 to intensify the light on the object and reduce unnecessary scattering. The platen 85 on which the object is positioned for projection may be transparent, translucent or opaque; reflective or non-reflective. However, a reflective platen would give better radiometric results.

As an example of a typical set-up for this apparatus using a transparency object, assume that the projection distance to the viewing screen is 20 feet. The magnification on the auxiliary screen is 2.5× while that on the main screen is approximately 13× to 14×. The maximum size of the object is 4 inches by 5 inches. With these dimensions in mind the following would be the distances and data relating to the system shown in FIG. 2. Separations between elements—the distances between:

Light source 50 and lens 52=2.4 inches
Lens 52 and mirror 56=2 inches
Mirror 56 and lens 54=11 inches
Lens 54 and object 56=0 to .75 inch
Object 56 to beam splitter 64=8 inches
Beam splitter 46 and lens 60=9.7 inches
Lens 60 and mirror 70=4.25 inches
Beam splitter 64 and lens 62=10 inches
Lens 62 and mirror 72=4 inches
Mirror 72 and mirror 74=28 inches
Mirror 74 and auxiliary screen 66=13 inches.

Any pantograph device that would accomplish a direct transfer of motion from the lecturer's stylus 22 to the marking stylus 25 is acceptable. A reduction in movement of the two stylii is required since the object 20 (FIG. 1) is of a smaller size than the image 24 on the auxiliary platen 12. Any pantograph for accomplishing this motion and reduction in size is suitable for the overhead projector described. An example of a pantograph construction in accordance with the teachings of this invention follows:

The driving stylus 22 (see FIG. 1) is connected to a thin transparent bar A–C at point C thereon. Also pivotably connected to bar A–C are thin bars A–E and B–D in such a manner as to form a parallelogram ABDE. The pantograph apparatus is fixedly attached at point E to the housing of the apparatus. The attachment is by a pin or the like which permits rotation about point E. The marking stylus 25 is attached to bar B–D at point F.

The marking stylus 25 at point F and the driving stylus 22 at point C lie on a straight line which could be drawn through points E, F and C. Both stylii move parallel and similar to each other in the same direction over any straight or curved path. The displacement of stylus 22 will equal the displacement of stylus times the ratio *EF/EC*. Although this simple pantograph is shown for illustration, any pantographic device may be used to accomplish the results herein described without departing from the scope of this invention.

The advantages of the systems described herein for classroom, business conference, or other use in modern teaching and display techniques are obvious, as are the benefits this apparatus has over the prior art. Other versions of a pantograph apparatus in conjunction with the optical systems shown or other similar optical systems for achieving the same results of providing two screens with simultaneous projection of an object onto the screen are within the spirit of this invention.

While the invention has been described with reference to the structures disclosed herein it is not confined to the details set forth; and this application is intended to cover such modifications or changes as may come within the purpose of the improvements or the scope of the invention.

What is claimed is:
1. Apparatus for projecting an image and being capable of adding data to the image with a minimum of interference in the path of projection of the image, the combination comprising:
  a plate arranged in an optical path to support an object on which additional data is to be added,
  projection means to project the object from said platen toward a first viewing station,
  means to split the image rays between the platen and the first viewing station and to direct a portion thereof toward a second viewing station,
  means to image the portion of the image rays directed toward each viewing station on such viewing station at a size proportional to the object being projected,
  a pointer adjacent the second viewing station and being capable of traversing the area of the image formed thereat,
  a stylus operatively positionable at the object on the platen to place marks thereon, and
  pantograph means operatively connecting said stylus and said pointer and capable of following the movement of said pointer, whereby a movement of the pointed causes a relative movement of the stylus to add data onto said object for projection at said image viewing stations with a minimum of interference in the path of projection of said images.

2. Apparatus for projecting an image and being capable of adding data to the image with a minimum of interference in the path of projection of the image, the combination comprising:
a platen arranged in an optical path to support an object on which additional data is to be added,
a first viewing station,
projection means to project the object from said platen toward the first viewing station,
a second viewing station,
means to direct a portion of the image rays being projected from said platen toward said second viewing station,
pointer adjacent the second viewing station and being capable of traversing the area of the image formed thereat,
pantograph means connected to said pointer and capable of following the movement thereof,
a stylus positioned to contact the object on the platen to place marks thereon, said stylus operatively connected to said pointer by said pantograph means, the movement of said stylus being related to the pointer in the same direction at a proportion equal to the size proportion of the object relative to the projected image at the second viewing station whereby a movement of the pointer causes a related movement of the stylus thus marking the object with additional data and projecting the object and additional data at the first and second viewing stations with a minimum of interference in the path of projection of said images.

3. The apparatus of claim 2 wherein said second viewing station is comprised of a translucent material as adapted for rear projection of an image.

4. The apparatus of claim 2 wherein said second viewing station is comprised of a reflective, opaque material adapted for front projection of an image.

5. The apparatus of claim 2 wherein said means to direct the image rays toward said second viewing station comprises a beam splitter capable of directing approximately 80–95% of said rays toward said first viewing station and approximately 20–5% toward said second viewing station.

6. The apparatus of claim 2 wherein said first viewing station is in a generally vertical plane and said second viewing station is in a generally horizontal plane.

7. The apparatus of claim 6 wherein the vertical plane of said first viewing station intersects the horizontal plane of said second viewing station at a line nearest the bottom of the image on said second screen.

8. The apparatus of claim 6 wherein the plane of the first screen intersects the plane of the second screen at a line nearest the top of the image presented at the second screen.

9. The apparatus of claim 1 wherein said pantograph means is comprised of relatively thin, transparent connecting rods.

References Cited

UNITED STATES PATENTS

| 2,505,505 | 4/1950 | Sachtleben | 353—78 |
| 2,738,702 | 3/1956 | Angenieux | 353—21 |
| 2,813,455 | 11/1957 | Fitzgerald | 353—99 |
| 3,324,762 | 6/1967 | Walter et al. | 353—40 |

HARRY N. HAROIAN, Primary Examiner

U.S. Cl. X.R.

353—44